United States Patent [19]

Hardman

[11] Patent Number: 4,619,401
[45] Date of Patent: Oct. 28, 1986

[54] CONTROLLED DROPLET APPLICATOR

[75] Inventor: Dale G. Hardman, West Helena, Ark.

[73] Assignee: Sprayrite Manufacturing Co., Inc., West Helena, Ark.

[21] Appl. No.: 574,603

[22] Filed: Jan. 27, 1984

[51] Int. Cl.$^4$ .......................... B05B 3/10; B64C 11/06
[52] U.S. Cl. .................................. 239/214.17; 239/77;
239/223; 239/290; 239/418; 416/207; 47/1.7
[58] Field of Search ................ 239/77, 214.11, 214.17,
239/223, 224, 290, 225, 418; 47/48.5, 1.7;
416/206, 207

[56] References Cited

U.S. PATENT DOCUMENTS

| | | | |
|---|---|---|---|
| 2,636,720 | 4/1953 | Forrest | 416/207 |
| 3,421,588 | 1/1969 | Saula | 416/206 |
| 3,791,582 | 2/1974 | Mencacci | 239/77 |
| 4,225,084 | 9/1980 | Bals | 239/223 |

FOREIGN PATENT DOCUMENTS

| | | | |
|---|---|---|---|
| 294460 | 7/1928 | United Kingdom | 239/224 |
| 292940 | 7/1928 | United Kingdom | 239/223 |

OTHER PUBLICATIONS

Micronair Ground Spraying Equipment brochure describing the Micronair AU3000 spray heads.
Micron Corporation brochure describing the Micron/X1 CDA aerial spray unit.

Primary Examiner—Joseph F. Peters, Jr.
Assistant Examiner—Mary Beth O. Jones
Attorney, Agent, or Firm—Walker & McKenzie

[57] ABSTRACT

An improved controlled droplet applicator for applying fluid in droplet form to a target area. The applicator includes a rotary atomizer for generating fluid droplets of ideal size and density. The improvement includes a fan for rotating with the atomizer and for causing the fluid droplets to move toward the target area.

2 Claims, 14 Drawing Figures

CONTROLLED DROPLET APPLICATOR

BACKGROUND OF THE INVENTION

1. Field of the Invention

The present invention relates, in general, to controlled droplet applicators for use in applying liquid chemicals and the like to crops.

2. Description of the Prior Art

Liquid chemicals are typically sprayed on crops, bare ground and the like as pre- and/or post-emergence herbicides, fungicides and insecticides. The spraying may be accomplished with the aid of airplanes, tractors, and the like. A relatively recent development in this field has been controlled droplet applicators (CDAs). The CDAs provide a substantially uniform size liquid droplet to allow better control of the spraying. Such CDAs typically include one or more rotary atomizers for reducing liquid into a fine spray having substantially uniform sized droplets. More specifically, liquid is typically fed into the center of the atomizer and subsequent rotation of the atomizer causes the liquid to migrate to the periphery of the atomizer and be discharged therefrom as a spray of droplets. Bals, U.S. Pat. No. 4,225,084 discloses a rotary atomizer in the shape of a hollow truncated cone having a tooth periphery and internal radial grooves leading to the gaps between the teeth. The cone of the 084 patent is rotatably driven by an electric motor or by means of a turbine (Pelton wheel) attached to the central shaft of the cone above the body of the cone with fluid being sprayed against the turbine with sufficient velocity to cause the turbine and cone to rotate (the fluid then falls from the turbine into the cone where it is atomized). It is known that some such rotary atomizers for use in aerial spraying have been provided with air turbines whereby the movement of the air past the air turbines as the plane is moving causes the atomizers to rotate. None of the above prior art, taken as a whole, disclose or suggest the present invention.

SUMMARY OF THE INVENTION

The present invention is directed toward providing an improved controlled droplet applicator. The concept of the present invention is to combine a propeller fan with a rotary atomizer to afford a greater degree of control of the spray patterns than is possible without the fan.

The fan means of the present invention comprises, in general, a hub means for being attached to a rotary atomizer for rotation therewith; and vane means for being attached to the hub means and for rotation therewith and for causing the droplets of liquid being forced outward of the hollow cone to move toward a target area.

Rotary atomizer type spray nozzles provide a means to generate droplets of an ideal size and density for a high degree of application efficiency. However, rotary atomizers are noted for the lack of sufficient force to drive the emitted droplets toward the target. They are noted as being very dependant upon wind currents as a determinant of the ultimate point of droplet deposition. One object of the present invention is to provide a force which will carry the spray pattern to the desired target without materially changing the size and density of droplets selected for a given application.

The present invention differs from other arrangements of fans and rotary atomizers in that the propeller fan means of the present invention neither provides power to cause the atomizer to rotate nor provides a means to break up liquid into smaller droplets. Existing atomizer-fan combinations designed for use on aircraft rely on the movement of air past the fan to turn the atomizer and does nothing to assist in the proper placement of the droplets. Existing atomizer-fan combinations designed for use on ground equipment are positioned so that the fan thereof will "shear" large liquid droplets into smaller droplets and thereby introduce a variable into the uniformity of droplet formation.

The present invention is designed to be mounted below an atomizer cup of the general type developed by Edward J. Bals, U.S. Pat. No. 4,225,084. The cup and propeller fan are externally rotated by a hydraulic motor or other suitable power source. Droplet formation occurs above the fan and droplets are thrown horizontally a sufficient distance to clear the propeller fan. This insures that the integrity of droplet size and density is not altered directly by the fan.

DESCRIPTION OF THE PREFERRED EMBODIMENT

Figure 1:
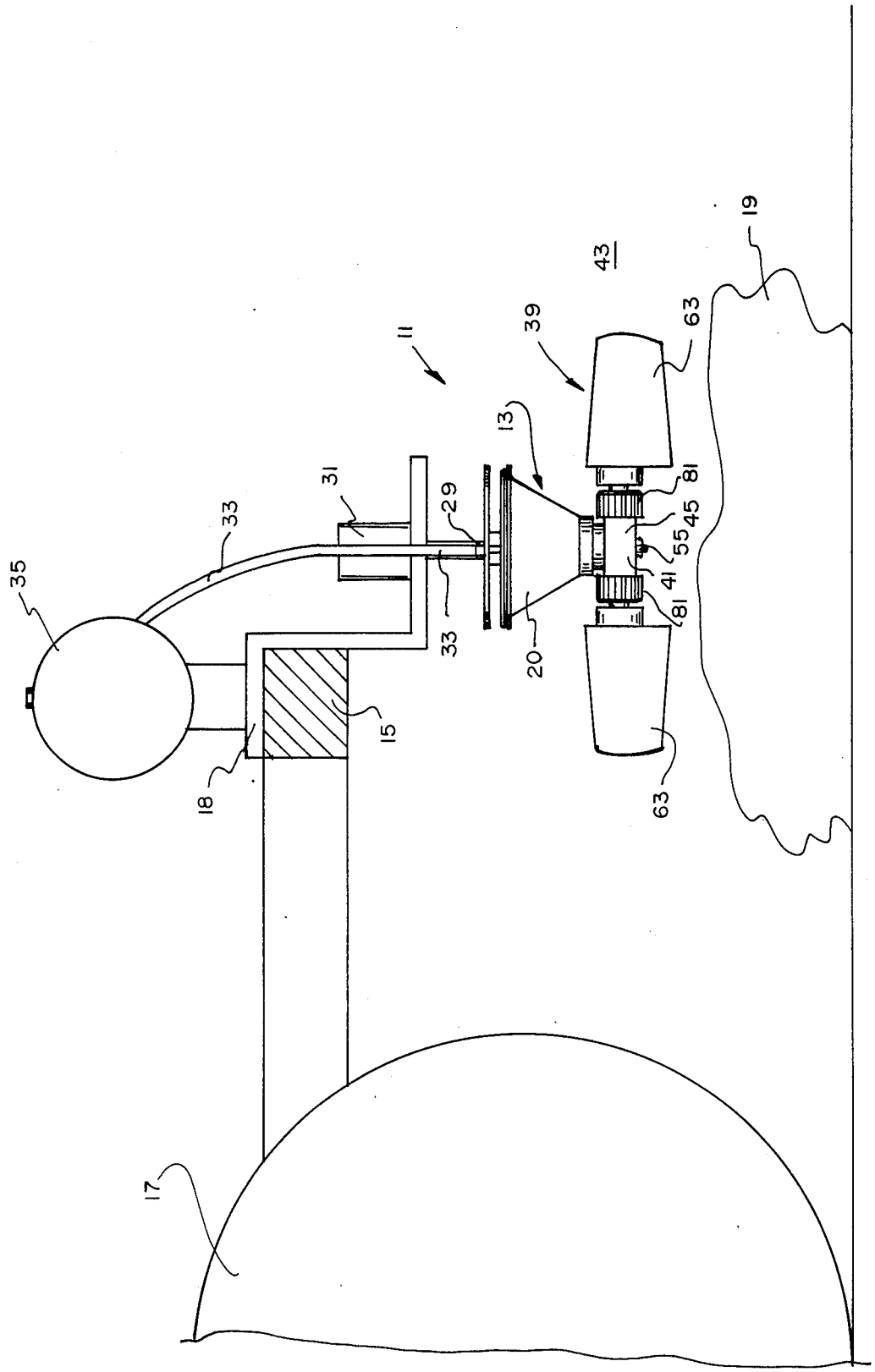
FIG. 1 is a somewhat diagrammatic side elevational view of the improved controlled droplet applicator of the present invention, shown in combination with a tractor.

The improved controlled droplet applicator 11 of the present invention is intended primarily for, but not limited to, agricultural chemical application. Because the application of chemicals to agricultural crop land is expensive and has inherent potential dangers to the environment, it should be carried out with the highest degree of precision possible. The applicator 11 includes, in general, one or more rotary atomizers 13 for being supported on a boom 15 and coupled to a tractor 17, or the like, by way of one or more brackets 18 for movement over the target area or vegetation 19 to be sprayed (see, in general, FIG. 1).

Figure 2:
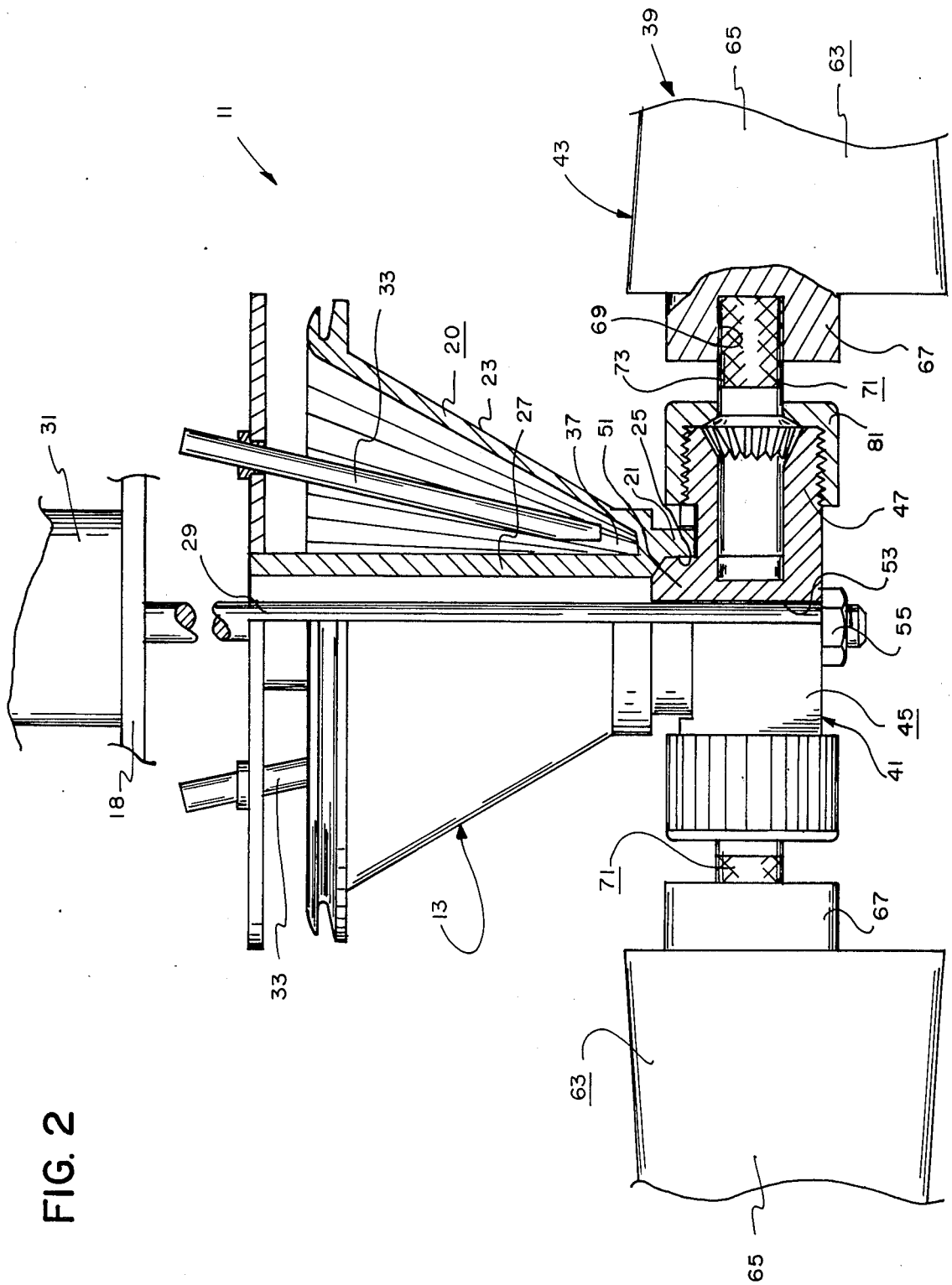
FIG. 2 is an enlarged rear elevational view of a part thereof with portions broken away for clarity.
Figure 3:
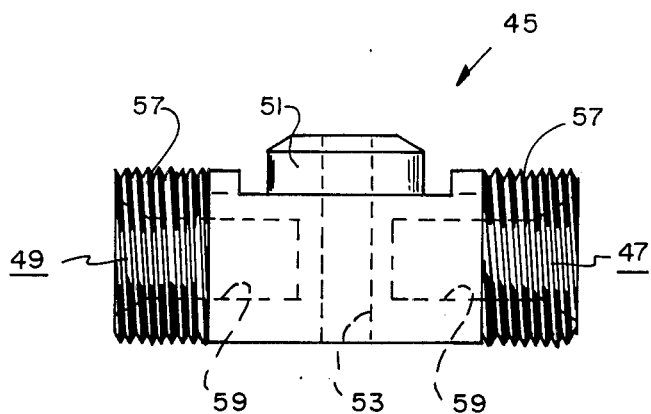
FIG. 3 is a front elevational view of one of the elements of the fan means of the improved controlled droplet applicator of the present invention.
Figure 4:
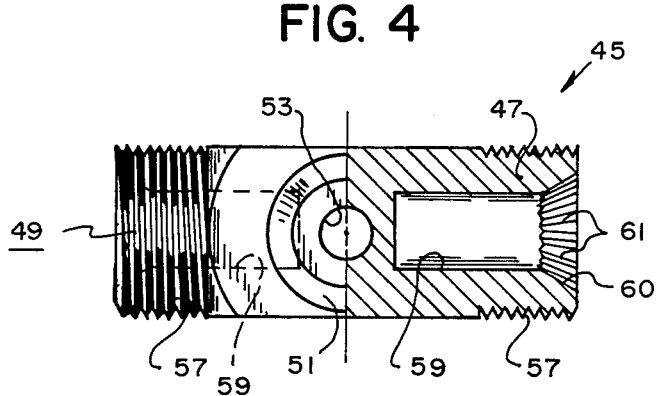
FIG. 4 is a top plan view of FIG. 3 with portions broken away for clarity.
Figure 6:
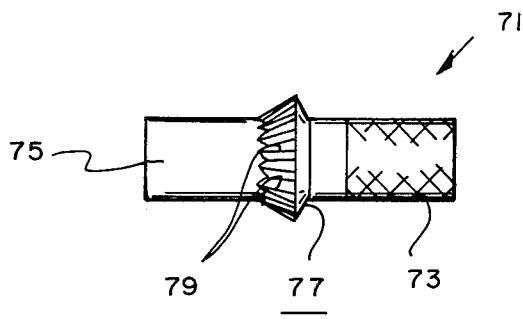
FIG. 6 is a front elevational view of one of the elements of the fan means of the improved controlled droplet applicator of the present invention.
Figure 5:
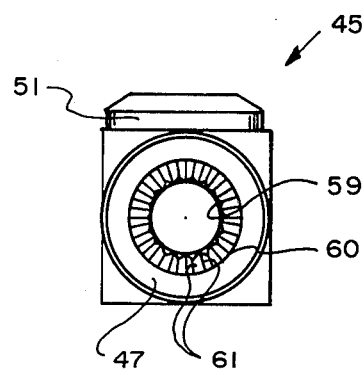
FIG. 5 is an end elevational view of FIG. 3.
Figure 7:
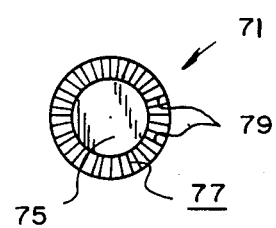
FIG. 7 is a left end elevational view of FIG. 6.
Figure 8:
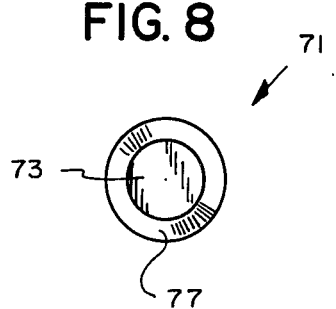
FIG. 8 is a right end elevational view of FIG. 6.
Figure 9:
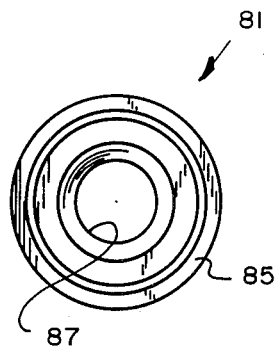
FIG. 9 is a front elevational view of another element of the fan means of the improved controlled droplet applicator of the present invention.
Figure 10:
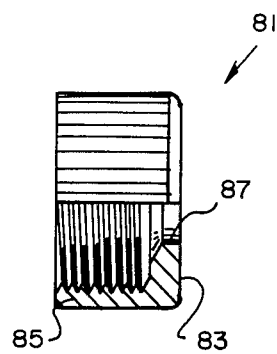
FIG. 10 is a side elevational view of FIG. 9 with portions thereof broken away for clarity.
Figure 11:
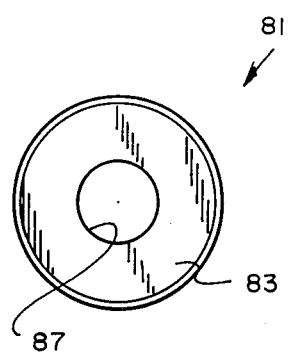
FIG. 11 is a rear elevational view of FIG. 9.
Figure 12:
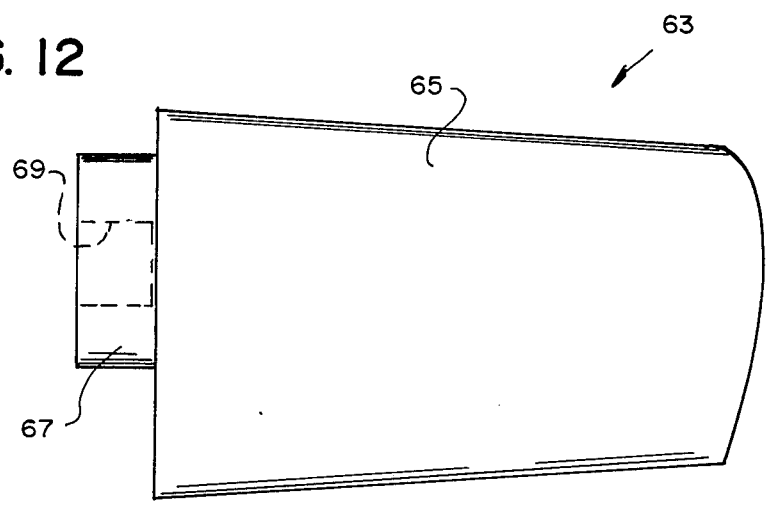
FIG. 12 is a top plan view of another element of the fan means of the improved controlled droplet applicator of the present invention.
Figure 13:
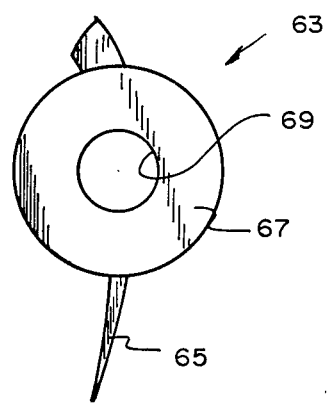
FIG. 13 is a left end elevational view of FIG. 12.
Figure 14:
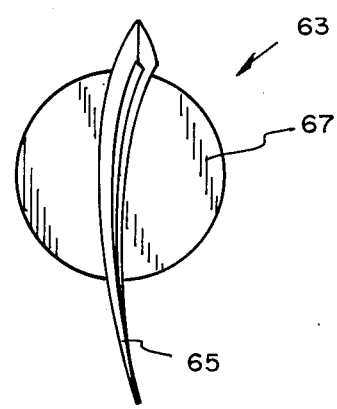
FIG. 14 is a right end elevational view of FIG. 12.

The rotary atomizer 13 may be of the type disclosed in Bals, U.S. Pat. No. 4,225,084 and include a body member such as a hollow truncated cone 20 (see, in general, FIG. 2) having a flat base 21 and a skirt 23 inclined at an angle of 60° to the axis of the cone 20. The inside of the skirt 23 has a plurality of radial grooves thereon. The flat base 21 may have a hollow portion 25 and a hollow central shaft 27 may extend upwardly from the base 21. For a more detailed description of the construction and operation of the cone 20, reference should be made to the above-cited '084 patent. The body member may consist of a dish, disc or the like rather than a cone as will be apparent to those skilled in the art.

A spindle 29 preferably extends through the hollow central shaft 27 and may be coupled to a rotary means, such as a hydraulic motor 31 or the like, and to the cone 20 for causing the cone 20 to rotate about its central axis in a manner which will hereinafter become apparent.

One or more stationary pipes 33 are preferably positioned within the cone 20 for allowing liquid to be introduced into the hollow body of the cone 20. The pipes 33 are connected to a liquid reservoir 35 to allow liquid to pass from the reservoir 35 through the pipes 33 to form a pool of liquid in the annulus 37 at the base 21 of the cone 20. Rotation of the cone 20 will cause fluid droplets of substantially uniform size and density to be generated and emitted into a mass of air substantially planar with the upper end of the cone in a manner apparent to those skilled in the art. The size and density of the droplets is controlled by the speed at which the cone 20 is rotated and by the flow rate at which the liquid is introduced into the cone 20.

The improvement of the present invention includes a fan means 39 (see, in general, FIGS. 1 and 2) especially designed to operate in conjunction with the rotary atomizer 13 to provide a force which will carry the spray pattern to the desired target 19 without materially changing the size and density of the droplets selected for a given application. The fan means 39 preferably includes a hub means 41 for being attached to the hollow cone 20 and for rotating therewith, and a vane means 43 for being attached to the hub means 41 and for rotating therewith and for causing the droplets of fluid being forced outward of the hollow cone 20 to move toward the target 19.

The hub means 41 preferably includes a body 45 (see, in general, FIGS. 3–5) having a first end 47, a second end 49 and a substantially perpendicular boss 51. The boss 51 is preferably shaped and sized so as to fit within the hollow portion 25 in the flat base 21 of the cone 20 as clearly shown in FIG. 2. A substantially perpendicular aperture 53 preferably extends through the body 45 and the boss 51 whereby the aperture 53 is in substantial alignment with the hollow central shaft 27 of the cone 20 when the boss 51 is positioned within the hollow portion 25 of the flat base 21 of the cone 20. Thus, the aperture 53 allows the spindle 29 to extend through the cone 20 and the body 45 of the hub means 41. A nut member 55 or the like can then be attached to the spindle 29 for coupling the hub means 41 and cone 20 to one another whereby the hub means 41 will rotate with the cone 20 and the spindle 29. The first and second ends 47, 49 of the body 45 are preferably provided with external threads 57 for reasons which will hereinafter become apparent. Substantially transverse cavities 59 are preferably provided in each end 47, 49 of the body 45 for reasons which will hereinafter become apparent. The outer end of each cavity 59 is preferably beveled to provide a conical outer portion 60. A number of spaced, radially extending grooves 61 are preferably provided on the conical outer portions 60 of each cavity 59 for reasons which will hereinafter become apparent.

The vane means 43 preferably includes a plurality of blade members 63 (see, in general, FIGS. 12–14). Each blade member 63 preferably includes an airfoil-shaped blade portion 65 and a hub portion 67 having a cavity 69 therein. The blade members 63 may be constructed in any manner apparent to those skilled in the art, such as by being integrally molded out of a plastic material or the like.

The vane means 43 also preferably includes a plurality of shaft members 71 (see, in general FIGS. 6–8) for extending between the blade members 63 and the hub means 41. Each shaft member 71 preferably includes a first end 73 for tightly fitting into the cavity 69 in the hub portion 67 of a respective blade member 63 whereby each blade member 63 is fixedly attached to a shaft member 71. The first end 73 of each shaft member 71 may knurled or the like to provide a secure attachment between the shaft member 71 and a respective blade member 63 as will be apparent to those skilled in the art. Additionally, each shaft member 71 includes a second end 75 for fitting into the cavity 59 in one end of the body 45 of the hub means 41. Each shaft member 71 is preferably provided with a raised, ring-like portion 77 intermediate the first and second ends 73, 75 thereof. The side of the ring-like portion 77 adjacent the second end 75 of the shaft member 71 is preferably substantially conical and preferably has a plurality of radially-extending grooves 79 therein for reasons which will hereinafter become apparent.

A nut member 81 (see, in general, FIGS. 9–11) is preferably provided for securing each shaft member 71 to the hub means 41. Each nut member 81 has a first end 83, a second end 85 and an aperture 87 extending completely therethrough between the first and second ends 83, 85. The aperture 87 is preferably stepped, having a relatively small diameter adjacent the first end 83 of the nut member 81 and having a relatively large diameter adjacent the second end 85 of the nut member 81. The relatively small diameter of the aperture 87 is sized so as to allow the nut member 81 to be positioned over the first end 73 of a respective shaft member 71 while preventing the nut member 81 from passing over the raised, ring-like portion 77 of the shaft member 71. The relatively large diameter portion of the aperture 87 is preferably internally threaded for coacting with the external threads 57 on a respective end of the body 45 of the hub means 41 whereby the nut member 81 can be used to fixedly attach a respective shaft member 71, and the blade member 63 attached thereto, to the body 45 of the hub means 41 in a manner as will now be apparent to those skilled in the art.

The improvement preferably includes adjustment means for allowing the pitch of the blade members 63 to be varied. The adjustment means is preferably defined by the radially-extending grooves 61, 79 and the nut member 81. That is, the radially-extending grooves 61, 79 coact with one another to lock the blade portions 65 at a given angle relative to the hub means 41. Thus, to adjust the pitch of the blade members 63, the nut member 81 is merely loosened on the hub means 41 and the radially-extending grooves 79 are moved out of engagement with the radially-extending grooves 61 whereby the blade members 63 can be rotated a certain amount. The radially-extending grooves 61, 79 can then be re-engaged and the nut member 81 screwed down to lock the blade member 63 in that position. The pitch of the blade member 63 may be varied relative to the angle of the chord of the blade portion 65 relative to the horizon. Thus, for example, the pitches provided may be 45°, 35°, 25°, 15° and 5° above the horizon.

To use the improved controlled droplet applicator 11 of the present invention, liquid is fed from the reservoir 35 to the rotary atomizer 13 in the typical manner. Rotation of the atomizer 13 will cause droplet formation above the fan means 39 and will throw the droplets horizontally sufficient distance to clear the vane means 43. This ensures that the integrity of droplet size and density is not altered directly by the fan means 39. The rotation of the fan means 39 creates an area of low pressure directly above the blade members 63. As higher pressure air from above the low pressure area rushes to equalize the pressure differential, movement of the air mass into which the droplets are emitted from the atomizer 13 is created. This movement is directed toward the intended target 19 and the droplets carried in the air mass are deposited with a higher degree of control than is possible without the directed movement of the air mass. The effect of the fan means 39 is twofold. Because the mass of air into which droplets are emitted may be directionally controlled, the adverse effects of wind and/or droplet drift are minimized. This permits the controlled application of smaller droplets than would be possible otherwise. The second effect of the fan means 39 is turbulence created by the "prop wash" or high pressure air moving from the blade members 63 to the target vegetation 19. This high pressure air mass contacts the target vegetation 19 and "stirs" it in such a manner that a greater percentage of the spray material may be deposited on areas of difficult accessibility, such as the underside of leaves, etc. This is particularly important to the application of chemicals requiring direct and total contact with the target vegetation 19. The amount of air movement required to properly direct the spray application is dependent on the droplet size and density selected by the applicator and can be controlled by adjustment of the pitch of the blade member 63 and the speed at which the fan means 39, and rotary atomizer 13, rotates. Thus, for example, the hydraulic motor 31 may be capable of rotating the atomizer 13 and fan means 39 at any speed up to, for example, 6,000 revolutions per minute. The rotation of the fan means 39 is clockwise when viewed from the discharge side thereof.

Although the invention has been described and illustrated with respect to a preferred embodiment thereof and a preferred use therefore, it is not to be so limited since changes and modifications can be made therein which are within the full intended scope of the invention.

I claim:

1. Controlled droplet applicator means for applying fluid in droplet form to target vegetation, said applicator comprising:
   (a) means for emitting fluid droplets against target vegetation;
   (b) fan means for creating a high pressure air mass to stir the target vegetation as the fluid droplets are emitted against it without materially changing the size or density of the droplets, said fan means including a plurality of blade members; and
   (c) adjustment means for allowing the pitch of said blade members to be varied and for controlling the amount of air movement to properly direct the air mass with the droplets therein to the target vegetation without further atomization of the droplets.

2. Controlled droplet applicator means for applying fluid in droplet form to target vegetation, said applicator comprising;
   (a) an atomizer means for emitting fluid droplets in a substantially horizontal air mass;
   (b) fan means including a plurality of blade members for creating an area of low air pressure directly above said blade members so that as higher pressure air from above the low pressure area rushes to equalize the pressure differential, the air mass into which the droplets are emitted is caused to move toward the target vegetation without materially changing the size or density of the droplets; and
   (c) adjustment means for allowing the pitch of said blade members to be varied and for controlling the amount of air movement to properly direct the air mass with the droplets therein to the target vegetation without further atomization of the droplets.

* * * * *